UNITED STATES PATENT OFFICE.

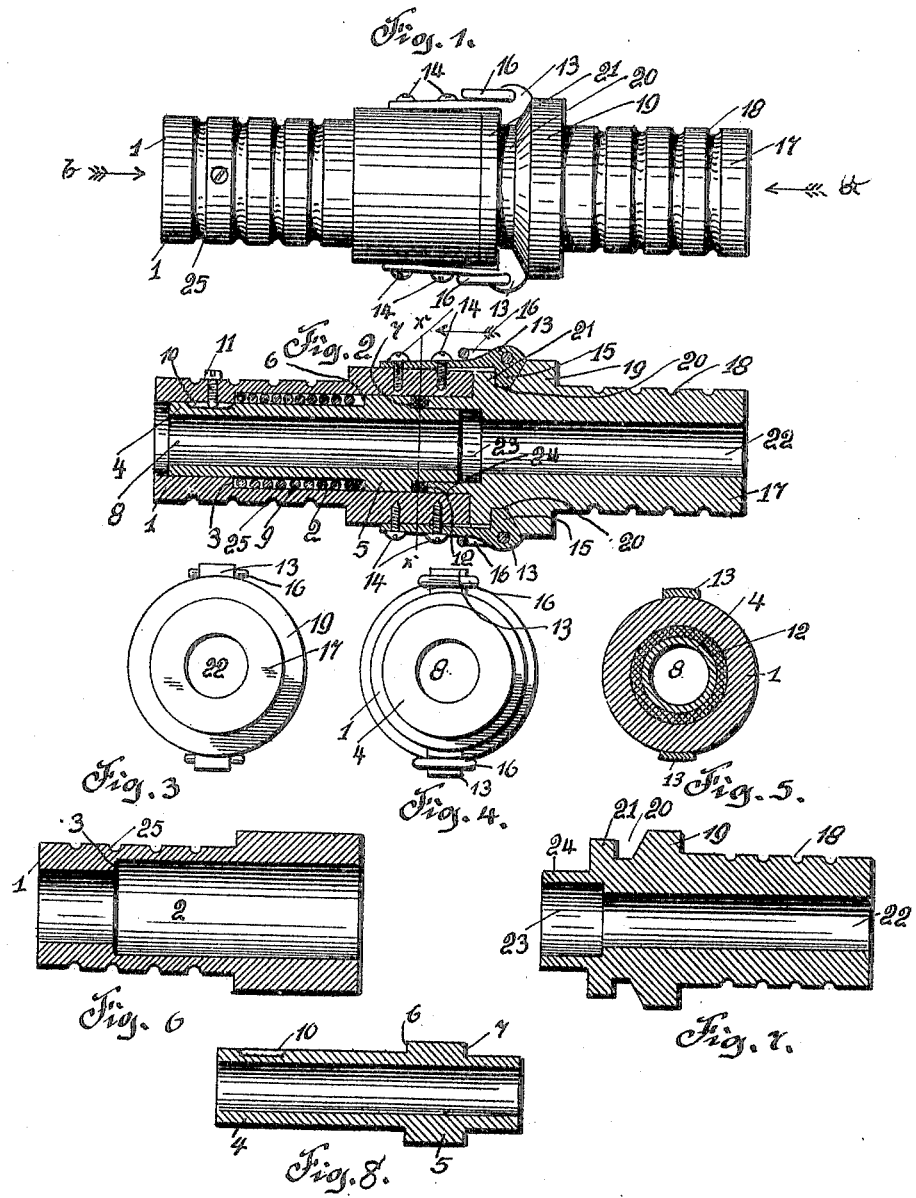

ANDERS GUSTAV FLYBERG, OF BRADDOCK, PENNSYLVANIA.

PIPE-COUPLING.

No. 820,774.

Specification of Letters Patent.

Patented May 15, 1906.

Application filed August 30, 1905. Serial No. 276,382.

*To all whom it may concern:*

Be it known that I, ANDERS GUSTAV FLYBERG, a subject of the King of Sweden and Norway, residing at 519 Lobenyer avenue, Braddock, in the county of Allegheny and State of Pennsylvania, have invented certain new and useful Improvements in Pipe-Couplings, of which the following is a specification, reference being had therein to the accompanying drawings.

This invention relates to certain new and useful improvements in pipe-couplings, and pertains to that particular type in which the union between the interfitting male and female members is instantly effected.

I am aware that devices possessing this general nature have been heretofore constructed; but the great objection in such devices has been that where the union was instantly effected and where the parts could be instantly disengaged the joint therebetween was very poorly packed, thereby allowing of a great deal of leakage in the fluid passing therethrough.

In the construction of my invention the primary object is to overcome the objection above noted, and to the furtherance of this purpose I have provided in one of the interfitting members a yielding member which carries at its outer surface a fluid-tight packing-ring, said yielding member being at all times under resilient pressure.

The detailed construction will appear as the description proceeds, reference being had to the accompanying drawings, forming a part of this specification, and like numerals designating like parts throughout the several views, in which—

Figure 1 is an elevation showing the relation between the interfitting coupling members. Fig. 2 is a central longitudinal section thereof. Fig. 3 is an end elevation looking toward the arrow *a* in Fig. 1. Fig. 4 is an end elevation looking toward the arrow *b* in Fig. 1. Fig. 5 is a transverse section on the line *x x* of Fig. 2 looking in the direction of the arrow. Fig. 6 is a detail longitudinal central section of the female member. Fig. 7 is a similar view of the male member, and Fig. 8 is a similar view of the yieldable packing member.

Referring now to the drawings, the female member 1 is provided with a central bore, which is enlarged, as at 2, to form a shoulder 3. A yieldable tubular member 4 is slidably mounted in said member 1, said member 4 having the same external diameter as the internal diameter of the fluid-conducting bore of the member 1. The member 4, adjacent the one end thereof, is formed with an enlarged portion 5, having squared annular shoulders 6 and 7, located on each side thereof. The enlarged portion 5 of the tubular member 4 is of the same external diameter as the internal diameter of the enlarged bore 2 of the member 1. The tubular member 4 is provided with a central passage-way or bore 8, which is in registry with the corresponding bore of the male member. Between the annular shoulder 3 upon the female member 1 and the annular shoulder 6 upon the yieldable member 4 an expansive spiral spring 9 is interposed. This spring bears at one end against the shoulder 3 and with the other end against the shoulder 6 and tends to force said tubular member 8 inwardly toward the male member. The movement of said tubular member, however, is limited by virtue of a groove 10, formed therein, with which a stub-screw 11, threaded in the female member 1, coacts. It is obvious that the screw 11 will fit into the groove 10 in the performance of this function.

A packing-ring 12 of rubber or any other well-known material is secured upon the member 4, adjacent the shoulder 7 thereof, being held between the inner periphery of the female member 1 and the outer periphery of the member 4 beyond said shoulder 7. For the purpose of effecting a positive union with the male member I have arranged at diametrically opposite points of the female member 1 a pair of spring-fingers 13, which are secured in the member 4 by screws 14 or other desirable fastening. The gripping-fingers 13 are formed with hooked ends 15 and are provided adjacent said hooked ends with links or handles 16, by which they are removed from locking engagement with the male member. The male member is designated by numeral 17 and is provided with a corrugated portion 18, adapted to receive a section of tubing, and with an enlarged portion 19, adjacent the inner end thereof, in which enlarged portion is formed a groove 20 of the same contour as the contour of the hooked end 15 of the spring-fingers 13 upon the female member 1. Adjacent the groove 20 the male member 17 is formed with an annular flange or shoulder 21, which bears against the inner side of the female member 1. The member 17 is provided with a central bore 22 in communication with the bore 8 of the yielding tubular member 4. The bore 22 is enlarged adjacent the inner end of the male member, as at 23, so as to form an extension 24 upon said male member which will be of sufficient thickness to interfit in the space between the tubular member 8 and the female member 1. The inner edge of the male member confronts the abutting packing-ring 12, corresponding to the corrugated surface 18 upon the male member. The female member is provided with a corrugated surface 25, which, like the surface 18, is adapted to receive a section of tubing.

In practical use the sections are placed in position to be united, the bores 22 and 23 of the male member and tubular member being in registry and extension 24 interfitting in the concentric space between the member 8 and the female member and confronting the packing-ring 12. At this time the yielding tubular packing member will be forced outwardly under pressure of spring 9 until the stop-pin 11 impinges against the rear wall of the groove 10, thereby limiting the movement of said tubular member. Pressure being then applied to the male member, the latter will be forced inwardly, the one edge thereof abutting the packing 12 and forcing inwardly therewith the tubular member 4 to the limit of its movement until the stop-pinion 11 engages the front wall of the groove 10, at which time the spring-fingers 13, being retained over the flange 21 upon the male member, will enter the side faces of the groove 20, thereby effecting a locking fluid-tight engagement between the male and female members. In the furtherance of the action of the spring-fingers 13 it is to be noted that the outer face of the hooked end 15 thereof is provided with an inwardly-beveled edge 26, by which the said fingers are enabled to ride over flange 21. The opposite side of the hooked end 15 is formed with a vertical edge 27, so that when the fingers 13 are seated in the groove 20 the vertical edge 27 thereof will abut the corresponding vertical wall of said groove 20, which, as above noted, is of the same configuration as the hooked end 15 of said fingers, and will prevent the displacement of the female member.

When it is desired to unlock the sections, the gripping-fingers 13 are lifted from the groove 20 by means of the handles 16, at which time the yielding tubular packing member 4, under pressure of the spring 9, will be moved to expel the male member 1 from its locking engagement with member 2.

It is readily apparent that various minor changes may be made without departing from the spirit and scope of my invention, as defined in the appended claims.

Having fully described my invention, I claim—

1. A pipe-coupling embodying interfitting sections, a plurality of gripping-fingers carried by one section, the other section being formed with a groove and an annular shoulder adjacent said groove, said fingers being adapted to seat in said groove, a tubular member concentrically arranged in one of said sections and adapted to move therein and extending into the other section, said tubular member being formed with an annular shoulder adjacent its end, a stub-screw passing through the wall of the section containing the tubular member and into a groove in the said tubular member, said screw limiting the movement of said tubular member in both directions, a spring surrounding the tubular member, said spring forcing the annular shoulder on the tubular member against the confronting edge of the opposite interfitting member and a fluid-proof packing interposed between the annular shoulder on the tubular member and the end of said opposite interfitting member.

2. A pipe-coupling embodying interfitting male and female members, said female member being formed with a central bore of enlarged diameter along the inner portion thereof, and being formed with a shoulder adjacent the termination of said enlarged bore, a tubular packing member concentrically and slidably mounted within said female member, said packing member being provided adjacent the inner end thereof with an enlarged portion of slightly less diameter than the enlarged bore of said female member, a spiral expansive spring interposed between said shoulder of said female member and said enlarged portion of said tubular member, said spring being designed to force said tubular member inwardly against said male member, a stub-screw passing through the wall of said female member and into a groove in the said tubular member for limiting the movement of said tubular member, a packing-ring mounted upon the one end of said tubular member and adapted to be abutted by the inner end of said male member, a series of gripping-fingers carried by said female member, said male member being formed with a peripheral groove in which said fingers are adapted to enter to effect a locking engagement between said male and female members, said male member being formed with a tubular extension provided with an enlarged bore adapted to enter the concentric space existing between said tubular member and said female member.

In testimony whereof I affix my signature in the presence of two witnesses.

ANDERS GUSTAV FLYBERG.

Witnesses:
E. H. HUTZEN,
C. KLOSTERMANN.